(12) United States Patent
Hirai

(10) Patent No.: US 7,876,370 B2
(45) Date of Patent: Jan. 25, 2011

(54) IMAGE CAPTURE APPARATUS WITH NOISE REMOVAL USING HIGH FREQUENCY SIGNAL EXTRACTION

(75) Inventor: Shinya Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 720 days.

(21) Appl. No.: 11/211,996

(22) Filed: Aug. 25, 2005

(65) Prior Publication Data

US 2006/0066735 A1    Mar. 30, 2006

Related U.S. Application Data

(63) Continuation of application No. PCT/JP2005/008264, filed on Apr. 22, 2005.

(30) Foreign Application Priority Data

Sep. 16, 2004   (JP) ............................. 2004-269958

(51) Int. Cl.
    *H04N 5/208* (2006.01)
(52) U.S. Cl. .................... 348/252; 348/222.1; 348/234
(58) Field of Classification Search .................. 386/31, 386/44; 382/266, 260, 270; 348/222.1, 234, 348/252
See application file for complete search history.

(56) References Cited

U.S. PATENT DOCUMENTS 5,548,330 A * 8/1996 Hieda et al. ................. 348/234
7,453,504 B2 * 11/2008 Ikeda ......................... 348/252
2003/0138162 A1 * 7/2003 Hirai .......................... 382/266

FOREIGN PATENT DOCUMENTS

| JP | 07-135584 | 5/1995 |
|---|---|---|
| JP | 08-140111 | 5/1996 |
| JP | 08-168021 | 6/1996 |
| JP | 11-017954 | 1/1999 |
| JP | 2003-219206 | 7/2003 |
| JP | 2003-219207 A | 7/2003 |

* cited by examiner

*Primary Examiner*—David L Ometz
*Assistant Examiner*—Antoinette T Spinks
(74) *Attorney, Agent, or Firm*—Cowan, Liebowitz & Latman, P.C.

(57) ABSTRACT

An image capture apparatus includes a high frequency signal extraction unit, a first filter unit, a second filter unit and a level setting unit. The high frequency signal extraction unit extracts a high frequency signal from an input signal. The first filter unit applies a horizontal band-pass filter to the input signal. The second filter unit applies a vertical band-pass filter to the input signal. The level setting unit sets a level, which is used to remove a noise component from the high frequency signal, to one of a first level and a second level lower than the first level. The level is set to the first level, if the input signal is obtained from a first area including low contrast. The level is set to the second level, if the input signal is obtained from a second area including small pattern.

8 Claims, 8 Drawing Sheets

FIG. 3

| R11 | G12 | R13 | G14 |
|-----|-----|-----|-----|
| G21 | B22 | G23 | B24 |
| R31 | G32 | R33 | G34 |
| G41 | B42 | G43 | B44 |

US 7,876,370 B2

IMAGE CAPTURE APPARATUS WITH NOISE REMOVAL USING HIGH FREQUENCY SIGNAL EXTRACTION

This application is a continuation of International Application No. PCT/JP2005/008264, filed Apr. 22, 2005, which claims the benefit of Japanese Patent Application No. 2004-269958, filed Sep. 16, 2004.

BACKGROUND OF THE INVENTION

1. Field of the Invention

The present invention relates to an image capture apparatus that is arranged to capture a digital color image.

2. Related Background Art

One of the contour correction methods of correcting the contour portion of a digital color image captured by an image capture apparatus such as a digital camera is a well-known contour correction method employing base clip processing (e.g., Japanese Patent Application Laid-Open No. 2003-219206, Japanese Patent Application Laid-Open No. 2003-219207). The Japanese Patent Application Laid-Open No. 2003-219206 proposes to decrease the base clip level in accordance with the frequency characteristic of an input signal. The Japanese Patent Application Laid-Open No. 2003-219207 proposes to decrease the base clip level in accordance with the signal level of an input signal.

However, the contour correction method as described in Japanese Patent Application Laid-Open No. 2003-219206 considers only the frequency characteristic in a certain direction for a band-pass filter extracting the frequency characteristic around a subject pixel, whereby the base clip level of the area where there is no small pattern but there is edge, might be lowered depending on the orientation of edge. In this case, noises increases around the edge, resulting in a drawback that the image quality of that part may be deteriorated.

SUMMARY OF THE INVENTION

An object of the present invention is to resolve the above-mentioned drawback.

Another object of the invention is to provide an image capture apparatus which can suppress noise in the area where there is edge, and can increase resolution in the area where there is small pattern.

One of an image capture apparatus of the present invention comprises, for example, high frequency signal extraction means for extracting a high frequency signal of a frequency higher than a predetermined frequency from an input signal, and level setting means for setting a level removing a noise component from the high frequency signal wherein the level can be changed in accordance with the frequency characteristic in a direction which has high correlation.

Another one of an image capture apparatus of the present invention comprises, for example, high frequency signal extraction means for extracting a high frequency signal of a frequency higher than a predetermined frequency from an input signal, and level setting means for setting a level for removing a noise component from the high frequency signal, wherein the level can be changed depending on whether or not the color is a predetermined color and in accordance with the frequency characteristic in a direction which has high correlation.

Still another one of an image capture apparatus of the present invention comprises, for example, high frequency signal extraction means for extracting a high frequency signal of a frequency higher than a predetermined frequency from an input signal, and level setting means for setting a level for removing a noise component from the high frequency signal, wherein if the input signal is obtained from a first area where the contrast is low, the level is set to a first level, and if the input signal is obtained from a second area where there is small pattern, the level is set to a second level lower than the first level.

Still another one of an image capture apparatus of the present invention comprises, for example, high frequency signal extraction means for extracting a high frequency signal of a frequency higher than a predetermined frequency from an input signal, and level setting means for setting a level for removing a noise component from the high frequency signal, wherein if the input signal is obtained from a first area which includes a specific color and low contrast is low, the level is set to a first level, and if the input signal is obtained from a second area which includes the specific color and small pattern, the level is set to a second level lower than the first level.

Other aspects and effects of the present invention will be more apparent from the following description with reference to the drawings. In the drawings, the same or like parts are designated by the same reference signs.

BRIEF DESCRIPTION OF THE DRAWINGS

The accompanying drawings, which are incorporated in and constitute a part of the specification, illustrate embodiments of the invention and, together with the description, serve to explain the technical ideas of the invention.

FIG. 3 is a diagram showing one example of a color filter of an image capture element shown in FIG. 1;

DESCRIPTION OF THE PREFERRED EMBODIMENTS

The preferred embodiments of the present invention will be described below in detail with reference to the drawings.

First Embodiment

Figure 1:
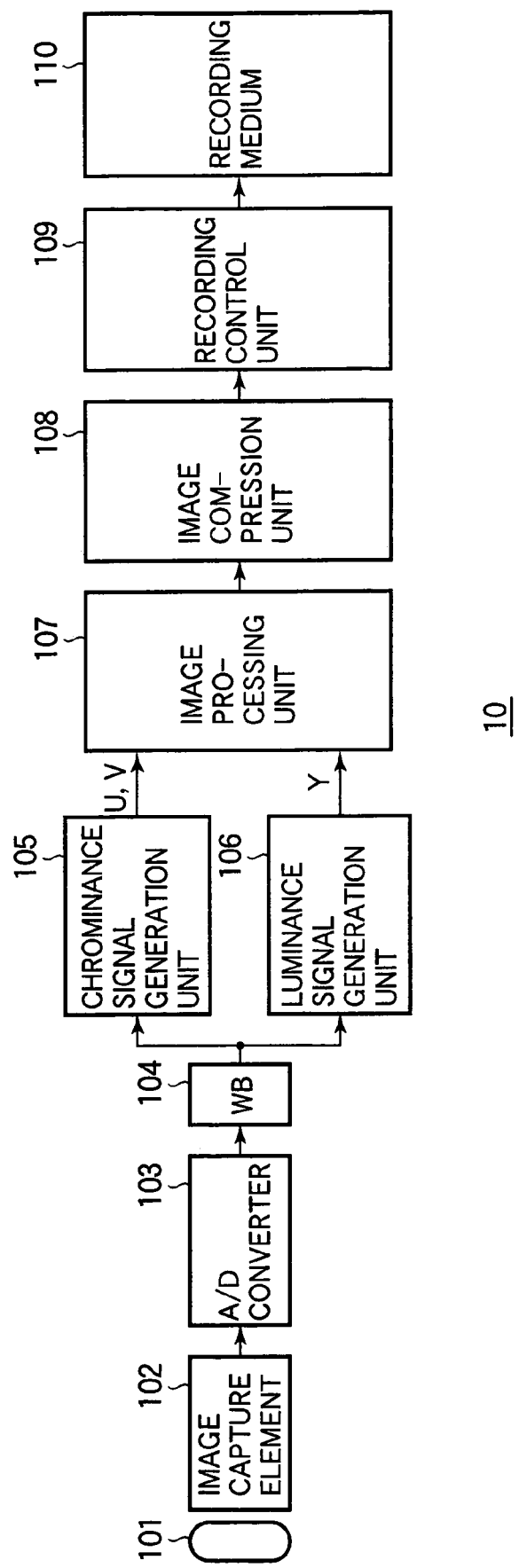
FIG. 1 is a block diagram showing the configuration of an image capture apparatus according to the first and second embodiments of the present invention.

FIG. 1 is a block diagram showing the configuration of an image capture apparatus 10 according to a preferred embodiment of the present invention. In a first embodiment, the image capture apparatus 10 is a digital camera that can capture a digital color image. However, the image capture apparatus 10 is not limited to the digital camera, but may be a digital video camera, a portable telephone with camera, a computer with camera, or a scanner device.

An image capture element 102 converts light (optical image) inputted into a lens part 101 into an electrical signal. A CCD or a CMOS image sensor may be employed for the image capture element 102. A Bayer array may be employed for a color filter of the image capture element 102. In the first embodiment, the Bayer array is employed shown in FIG. 3. An A/D converter 103 converts an electrical signal outputted from the image capture element 102 into digital form. A WB adjustment unit 104 adjusts the white balance of a digital signal outputted from the A/D converter 103.

A chrominance signal generation unit 105 generates two color difference signals U, V from the digital signal adjusted by the WB adjustment unit 104. A luminance signal generation unit 106 generates a luminance signal Y from the digital signal adjusted by the WB adjustment unit 104. An image processing unit 107 generates a digital color image, using the color difference signals U, V generated by the chrominance signal generation unit 105 and the luminance signal Y generated by the luminance signal generation unit 106, and converts the digital color image into the digital color image of resolution designated by the user.

An image compression unit 108 compresses the digital color image from the image processing unit 107 in accordance with a compression ratio designated by the user. The image compression methods available on the image compression unit 108 may include a JPEG method and a JPEG2000 method. A recording control unit 109 records the digital color image compressed by the image compression unit 108 on a recording medium 110. The recording medium 110 in a prescribed file format may be a memory card (a card-like recording medium having a non-volatile memory), a magnetic disk, an optical disk, and a hard disk. In the first embodiment, the recording medium 110 is removable from the image capture apparatus 10, but may be built in the image capture apparatus 10.

Figure 2:
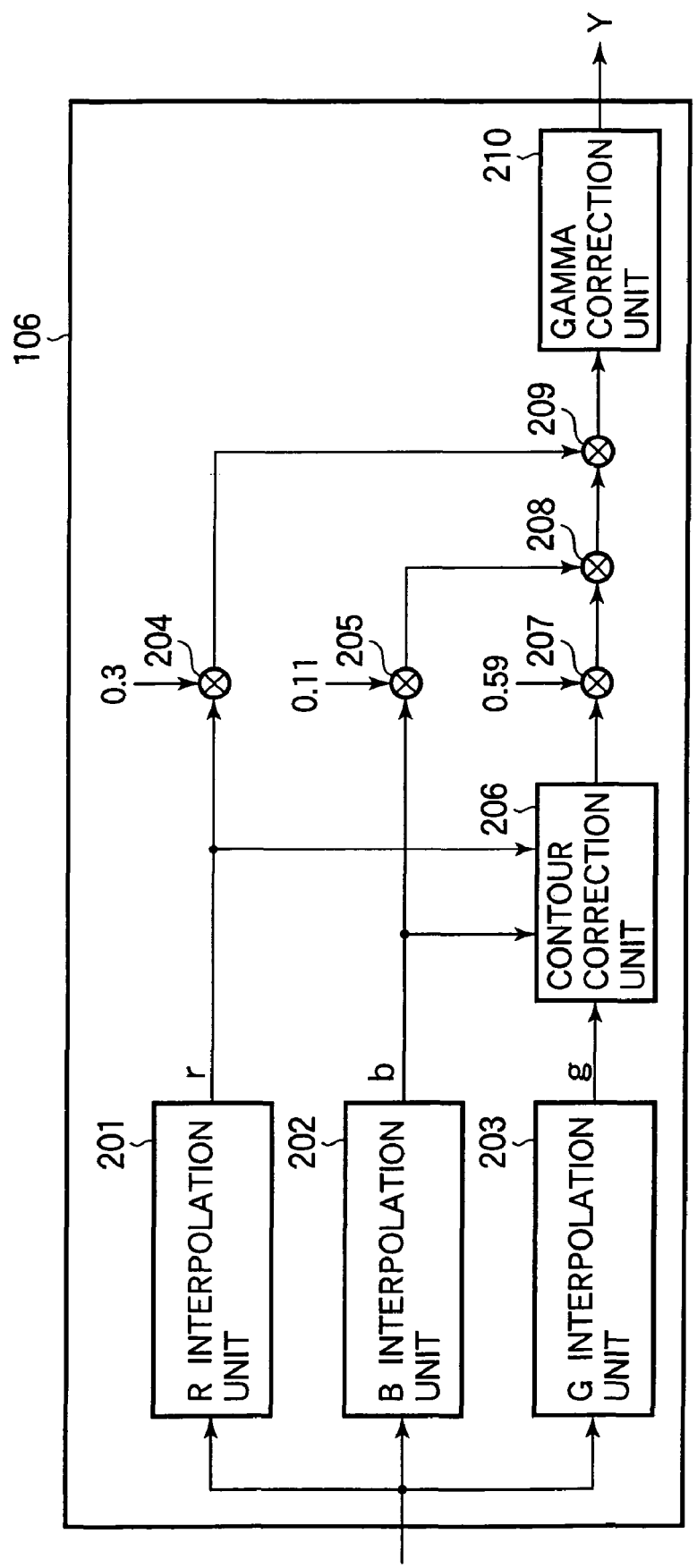
FIG. 2 is a block diagram showing the configuration of a luminance signal generation unit shown in FIG. 1.

FIG. 2 is a block diagram showing the configuration of the luminance signal generation unit 106 shown in FIG. 1.

An R interpolation unit 201 performs the color interpolation, employing a digital signal from the WB adjustment unit 104, to generate a red signal r of each pixel. A B interpolation unit 202 performs the color interpolation, employing the digital signal from the WB adjustment unit 104, to generate a blue signal b of each pixel. A G interpolation unit 203 performs the color interpolation, employing the digital signal from the WB adjustment unit 104, to generate a green signal g of each pixel.

A multiplier 204 multiplies the red signal r from the R interpolation unit 201 by 0.3. A multiplier 205 multiplies the blue signal b from the B interpolation unit 202 by 0.11. A contour correction unit 206 makes the contour correction on the green signal g from the G interpolation unit 203. A multiplier 207 multiplies the green signal g from the contour correction unit 206 by 0.59. An adder 208 adds an output signal of the multiplier 207 and an output signal of the multiplier 205. An adder 209 adds an output signal of the adder 208 and an output signal of the multiplier 204. A gamma conversion unit 210 makes the gamma conversion on an output signal of the adder 209 to generate a luminance signal Y.

Referring to FIG. 3, one example of color interpolation performed by the R interpolation unit 201, the B interpolation unit 202 and the G interpolation unit 203 will be described below. Since the same color interpolation is performed by the R interpolation unit 201, the B interpolation unit 202 and the G interpolation unit 203, color interpolation performed by the G interpolation unit 203 will be described in the first embodiment, and the explanation for the color interpolation performed by the R interpolation unit 201 and the B interpolation unit 202 is omitted.

First of all, the green signal g at the position of red pixel and blue pixel is made 0. Then, an LPF (Low-Pass Filter) of [1,2,1] is applied in each of the horizontal and vertical directions.

For example, the green signal g22 at the position of blue pixel B22 is calculated by the following expression.

$$g22=(G12+G21+G23+G32)/4$$

Also, the green signal g23 at the position of green pixel G23 is calculated by the following expression.

$$g23=(G12+G14+4\times G23+G32+G34)/8$$

The red signal r, blue signal b and green signal g of each pixel can be generated in accordance with the above procedure.

Figure 4:
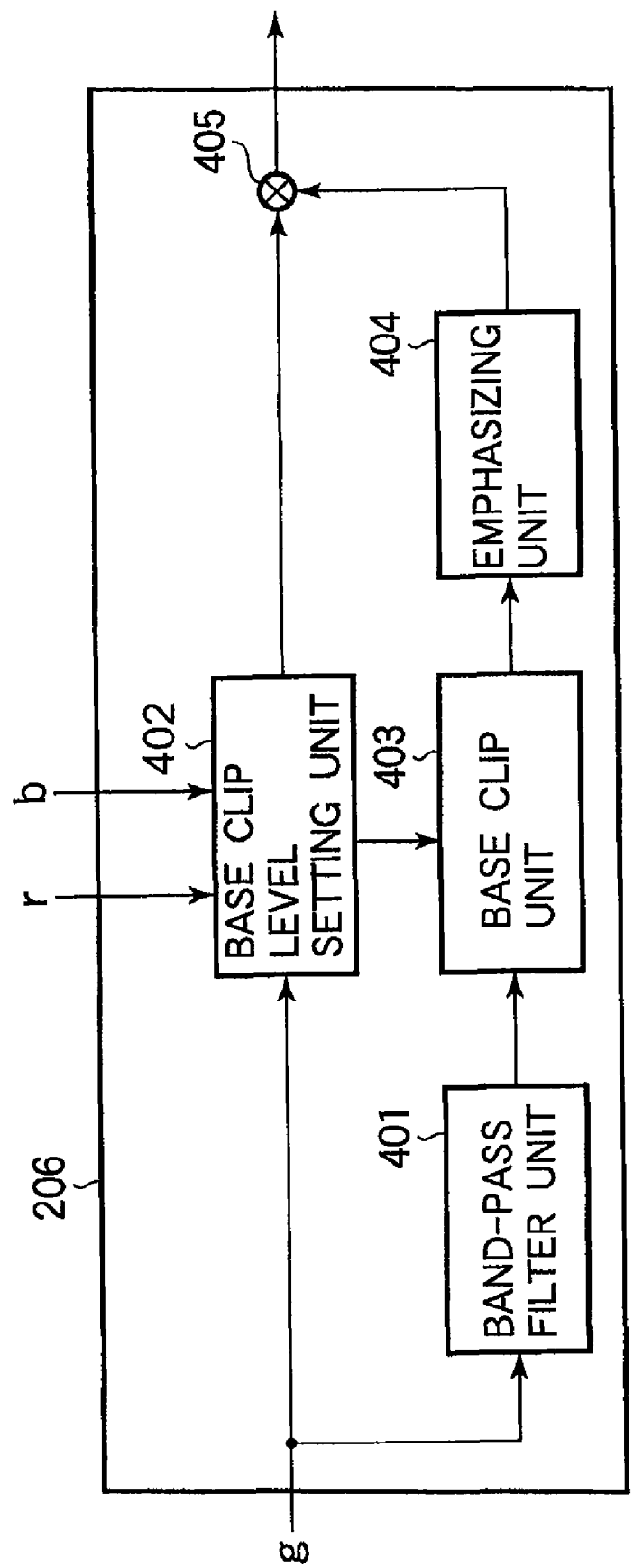
FIG. 4 is a block diagram showing the configuration of a contour correction unit shown in FIG. 2.

FIG. 4 is a block diagram showing the configuration of the contour correction unit 206 shown in FIG. 2.

A BPF (Band-Pass Filter) unit 401 extracts a high frequency signal of a frequency higher than a predetermined frequency from the green signal g outputted from the G interpolation unit 203. The high frequency signal outputted from the BPF unit 401 is inputted into a base clip unit 403. The base clip unit 403 removes the signal having an amplitude less than or equal to a base clip level from the high frequency signal to remove the noise component from the high frequency signal. The base clip level to be used in the base clip unit 403 is set by a BC (Base Clip level) setting unit 402.

An emphasizing unit 404 multiplies an output signal (high frequency signal with the noise component removed) of the base clip unit 403 by a certain factor. An adder 405 adds an output signal (high frequency signal with the noise component removed and after being emphasized) and the green signal g from the G interpolation unit 203. An output signal of the adder 405 becomes an output signal (green signal g after contour correction) of the contour correction unit 206.

Figure 5:
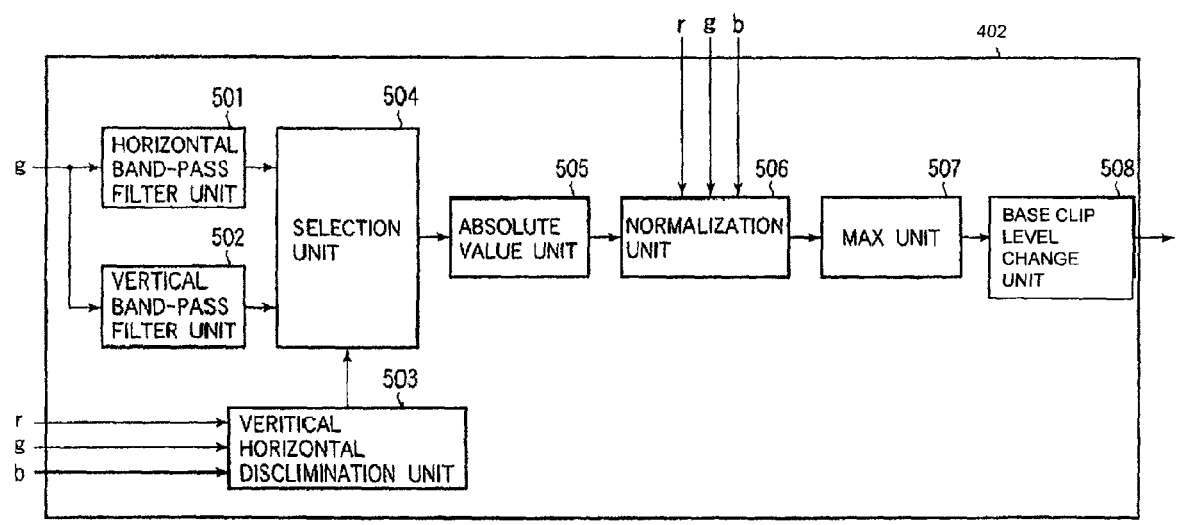
FIG. 5 is a block diagram showing a first example of the configuration of a BC level setting unit shown in FIG. 4.

FIG. 5 is a block diagram showing a first example of the configuration of the BC level setting unit 402 shown in FIG. 4.

A horizontal BPF (Band-Pass Filter) unit 501 applies horizontal BPF to the green signal g from the G interpolation unit 203. A vertical BPF (Band-Pass Filter) unit 502 applies vertical BPF to the green signal g from the G interpolation unit 203. A band-pass filter of [−1, 0, 2, 0, −1], for example, may be applied for the horizontal BPF and the vertical BPF. A vertical horizontal discrimination unit 503 checks the correlation between a subject pixel and a pixel adjacent to the subject pixel and discriminates the direction of the strongest correlation.

A selection unit 504 selects the horizontal BPF (Band-Pass Filter) 501, if the vertical horizontal discrimination unit 503 discriminates the horizontal direction to be the direction of the strongest correlation, or selects the vertical BPF (Band-Pass Filter) 502, if the vertical horizontal discrimination unit 503 discriminates the vertical direction to be the direction of the strongest correlation. An absolute value unit 505 obtains the absolute value of an output signal of the horizontal BPF unit 501 or vertical BPF unit 502.

A normalization unit 506 normalizes the output value of the absolute value unit 505 employing a luminance signal. For example, the output value of the absolute value unit 505 is divided by the value of luminance signal to normalize the output value of the absolute value unit 505. By normalizing the output value of the absolute value unit 505 with the luminance signal, the output value of the absolute value unit 505 can be almost equivalent even when the same object is captured brightly or darkly. That is, the value after normalization does not depend on the brightness at the time of photographing, but depends on the pattern of the object.

A MAX unit 507 searches the pixel having the largest value among the 3×3 pixel block around a subject pixel, and outputs the pixel having the largest value instead of the subject pixel. The MAX unit 507 performs this processing for all the pixels. By performing this processing for all the pixels, the value of each pixel is stabilized at the large value even in the area where the value is likely to change pixel by pixel.

Figure 6:
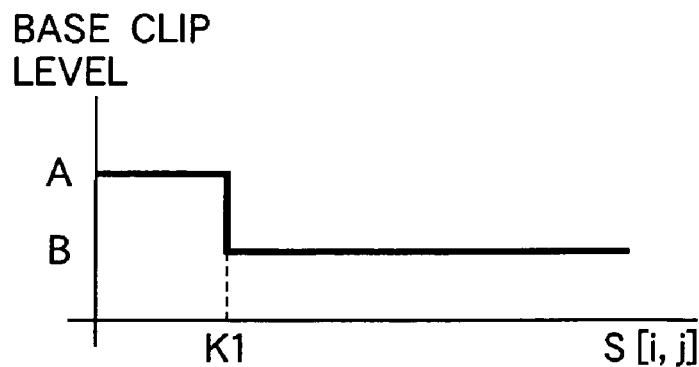
FIG. 6 is a diagram showing the relationship between the output value of a MAX unit shown in FIG. 5 and the base clip level.

A BC (Base Clip) level change unit 508 changes the base clip level in accordance with the output value S[i,j] of the MAX unit 507 and a threshold K1. Where i, j designate the position of the subject pixel. If S[i,j]<K1, the BC level change unit 508 changes the base clip level to the level A, shown in FIG. 6. If S[i,j]>K1, the BC level change unit 508 changes the base clip level to the level B, shown in FIG. 6. Herein, the level A i, double the level B, for example. K1 is set so that the base clip level for the pixels in the area where there is small pattern may be level B. K1 may be set at a value corresponding to the noise level of the image capture element 102, for example. The base clip level decided by the BC level change unit 508 is inputted into the base clip unit 403.

Figure 7:
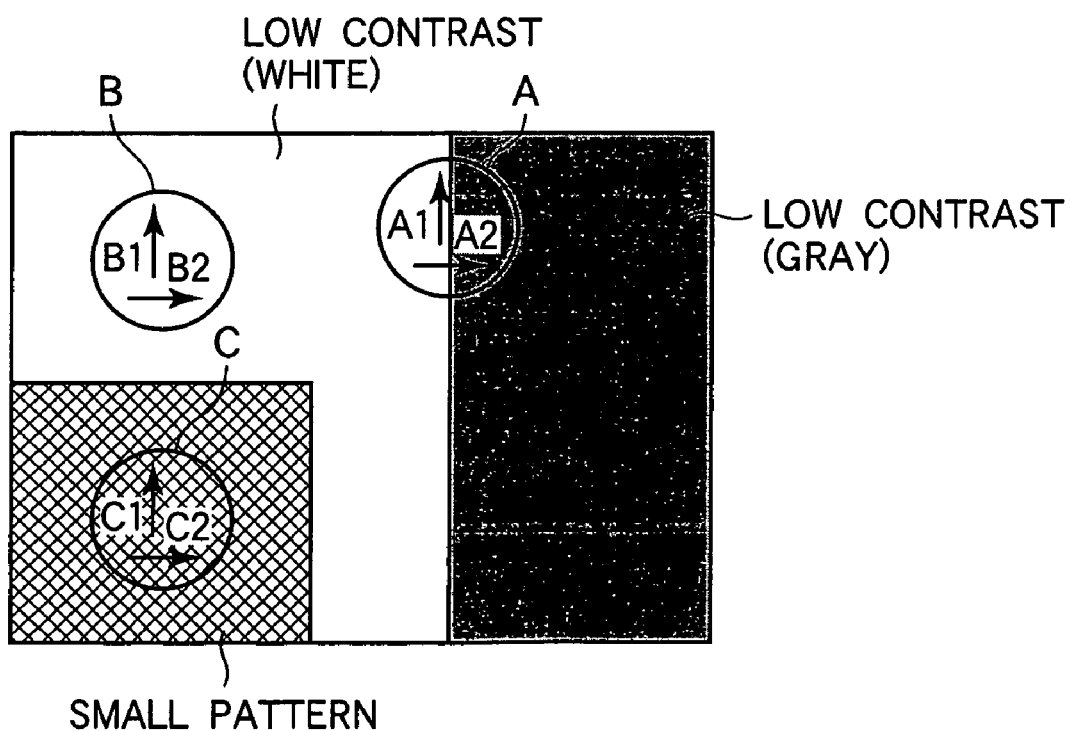
FIG. 7 is a view showing one example of a digital color image captured by the image capture apparatus according to the first and second embodiments.

In the image capture apparatus 10 according to the first embodiment by employing the BC level setting unit 402, the noise can be suppressed in the area where there is edge, and the resolution can be increased in the area where there is small pattern. Referring to FIG. 7, its reason will be described below.

FIG. 7 is a view showing one example of a digital color image captured by the image capture apparatus 10.

In FIG. 7, an area A has a clear edge, an area B has low contrast and no clear edge, and an area. C has small pattern.

In the area A, because there is clear edge, it is discriminated that there is stronger correlation in the vertical direction (A1) than in the horizontal direction (A2). In this case, the vertical BPF is selected, and the output value S[i,j] of the MAX unit 507 is smaller than the threshold K1. Therefore, in the area A, the base clip level is level A, and the noise that can be removed by the base clip unit 403 increases. Consequently, the noise of the area A is suppressed, and the image quality of the area A is increased.

In the area B, because the contrast is low and there is no clear edge, the direction having strong correlation changes pixel by pixel. However, even if any one of the vertical direction (B1) and the horizontal direction (B2) is selected, the output value S[i,j] of the MAX unit 507 is smaller than the threshold K1. Therefore, in the area B, the base clip level is level A, and the noise that can be removed by the base clip unit 403 increases. Consequently, the noise of the area B is suppressed, and the image quality of the area B is increased.

On the other hand, in the area C, like the area B, the direction having strong correlation changes pixel by pixel. However, because there is small pattern, the output value S[i,j] of the MAX unit 507 is larger than the threshold K1. Therefore, in the area C, the base clip level is level B. Consequently, the small pattern is less likely to be removed together with the noise, and the resolution of the area C is increased.

In this manner, with the image capture apparatus 10 according to the first embodiment, the noise can be suppressed in the area where there is edge, and the resolution can be increased in the area where there is small pattern.

The BC level setting unit 402 of the first embodiment may change the base clip level to the level B, if K1<S[i,j]<K2, and change the base clip level to the level C that is lower than the level B, if S[i,j]>K2. In this case, the suppression of the noise and the increase of the resolution can be adjusted according to the fineness of pattern.

In the BC level setting unit 402 of the first embodiment, the threshold K1 is the fixed value, but may be changed according to the level of the green signal g or the like. Also, the threshold K2 may be changed in the same manner as the threshold K1.

Also, in the BC level setting unit 402 of the first embodiment, the BPF is applied in the vertical or horizontal direction, but may be applied in the vertical, horizontal or oblique direction. In this case, the resolution is further increased in the oblique direction.

Second Embodiment

In a second embodiment, different parts from the first embodiment will be described below in detail.

Figure 8:
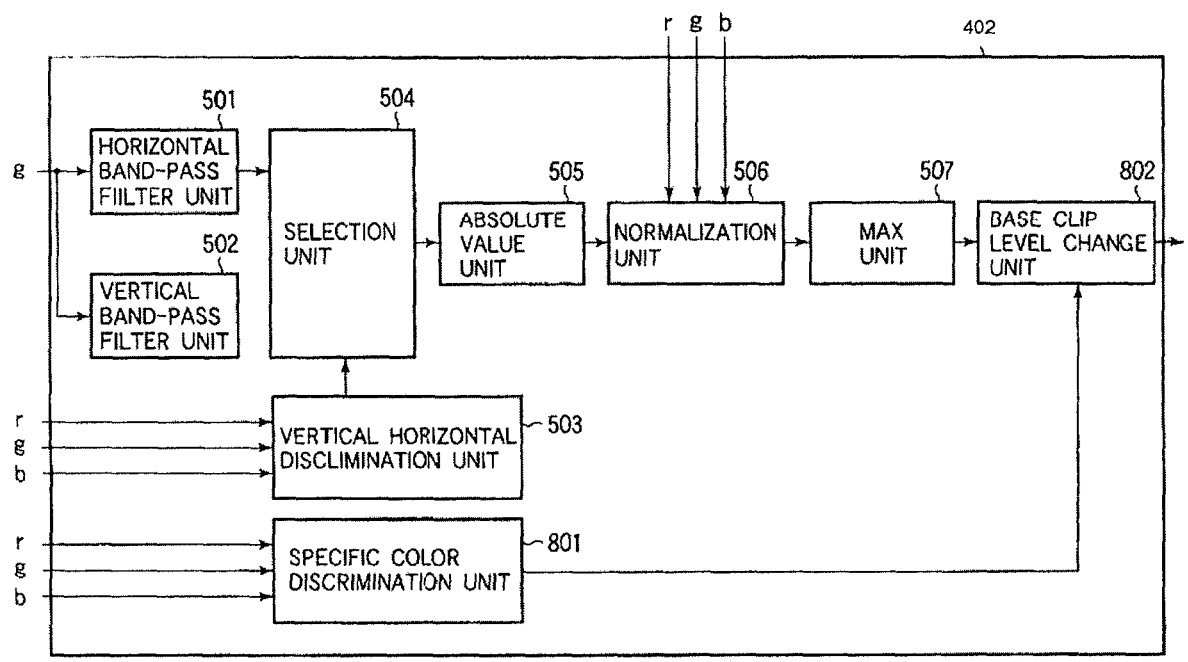
FIG. 8 is a block diagram showing a second example of the configuration of the BC level setting unit shown in FIG. 4.

FIG. 8 is a block diagram showing a second example of the configuration of the BC level setting unit 402 shown in FIG. 4. The BC level setting unit 402 of the second embodiment, unlike the BC level setting unit 402 of the first embodiment, can change the base clip level according to the color of the object. This function is effective when the resolution of the specific color is increased.

A specific color discrimination unit 801 discriminates whether or not the color of each pixel is specific color, using the red signal r from the R interpolation unit 201, the blue signal b from the B interpolation unit 202 and the green signal g from the G interpolation unit 203. Herein, the specific color includes one or more colors. A BC (Base Clip) level discrimination unit 802 changes the base clip level to the level B, only when the color of subject pixel is included in the specific color and S[i,j]>threshold K1. Otherwise, it changes the base clip level to the level A.

Figure 9:
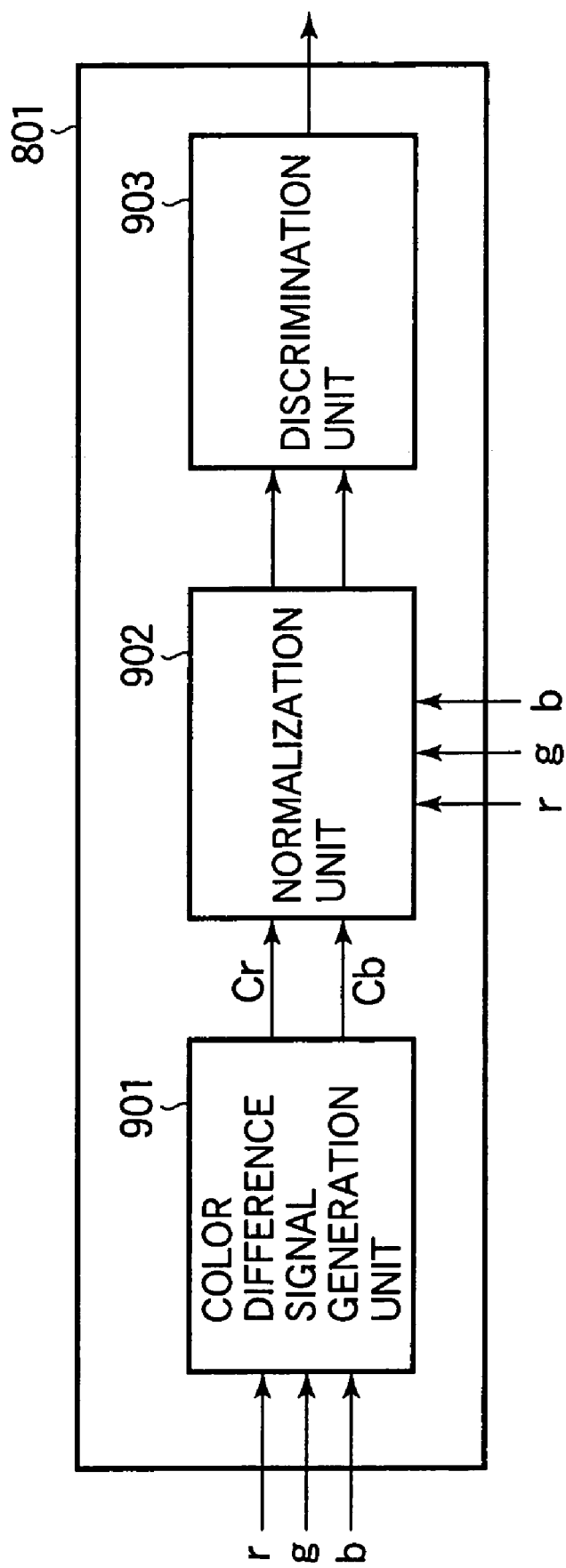
FIG. 9 is a block diagram showing the configuration of a specific color discrimination unit shown in FIG. 8.

FIG. 9 is a block diagram showing the configuration of the specific color difference signal generation unit 901 shown in FIG. 8.

The color difference signal generation unit 901 generates the color difference signals Cr and Cb in accordance with the following expressions.

$$Cr = 0.7r - 0.59g - 0.11b$$

$$Cb = -0.3r + 0.41g + 0.89b$$

The color difference signals Cr and Cb generated by the color difference signal generation unit 901 are inputted into a color normalization unit 902.

The color normalization unit 902 normalizes the color difference signals Cr and Cb using a luminance signal. For example, the color difference signals Cr and Cb are divided by the value of luminance signal to normalize the color difference signals Cr and Cb. By making the normalization with the luminance signal, the influence due to brightness at the time of photographing is reduced.

A discrimination unit 903 discriminates whether or not the color difference signals Cr[i,j] and Cb[i,j] can satisfy the following discrimination conditions. Where i, j designate the position of subject pixel. When the specific color includes multiple colors, the following discrimination conditions may exist for each color included in the specific color.

$$Kr1 < Cr[i,j] < Kr2$$

$$Kb1 < Cb[i,j] < Kb2$$

When the above discrimination conditions are satisfied, the color of subject pixel is discriminated to be included in the specific color. The values of Kr1, Kr2, Kb1 and Kb2 in the above discrimination conditions may be arbitrarily changed depending on what color the specific color is. Selection of the specific color may be made by the user. In this case, the discrimination unit 903 changes the values of Kr1, Kr2, Kb1 and Kb2 in the discrimination conditions in accordance with the specific color selected by the user.

The discrimination unit 903 notifies the discrimination result to the BC level discrimination unit 802, if it discriminates whether or not the color of subject pixel is included in the specific color. Only when the color of subject pixel is included in the specific color and S[i,j]>threshold K1, the BC level discrimination unit 802 changes the base clip level to the level B. Otherwise, the base clip level is changed to the level A.

In this manner, with the image capture apparatus 10 according to the second embodiment, the noise can suppressed in the area which includes the specific color and edge, and the resolution can be increased in the area which includes with the specific color and small pattern.

The BC level setting unit 402 of the second embodiment may change the base clip level to the level B, if the color of subject pixel is included in the specific color and K1<S[i,j]<K2, and may change the base clip level to the level C that is lower than the level B, if the color of subject pixel is included in the specific color and S[i,j]>K2. In this case, the suppression of the noise and the increase of the resolution can be adjusted according to the fineness of pattern.

In the BC level setting unit 402 of the second embodiment, the threshold K1 is the fixed value, but may be changed according to the level of the green signal g or the like. Also, the threshold K2 may be changed in the same manner as the threshold K1.

Also, in the BC level setting unit 402 of the second embodiment, the BPF is applied in the vertical or horizontal direction, but may be applied in the vertical, horizontal or oblique direction. In this case, the resolution is further increased in the oblique direction.

The scope of technical ideas of the present invention may not be limited by the preferred embodiments of the invention as described above. In this sense, the preferred embodiments of the invention are only illustrative.

Also, the technical ideas of the invention are defined by the claims, but may not be construed to be limited only by the description of the specification.

Further, various modifications or changes may be made without departing from the scope of technical ideas as defined in the claims and may constitute the technical ideas of the invention.

The present application claims priority from Japanese Patent Application No. 2004-26.9958, as filed on Sep. 16, 2004, the contents of which are incorporated herein to constitute a part of this application.

What is claimed is:

1. An image capture apparatus comprising:
a high frequency signal extraction unit that extracts a high frequency signal from an input signal;
a searching unit that searches a pixel having the largest value among a pixel block around a subject pixel;
a level selecting unit that (a) selects a first level if a value of the pixel searched by the searching unit is not larger than a first threshold value, (b) selects a second level lower that the first level if the value of the pixel searched by the searching unit is larger than the first threshold value and is smaller than a second threshold value, and (c) selects a third level lower than the second level if the value of the pixel searched by the searching unit is larger than the second threshold value; and
a noise component removing unit that (a) removes a noise component from the high frequency signal using the first level if the level selecting unit selects the first level, (b) removes a noise component from the high frequency signal using the second level if the level selecting unit selects the second level, and (c) removes a noise component from the high frequency signal using the third level if the level selecting unit selects the third level.

2. The image capture apparatus according to claim 1, wherein the high frequency signal includes a frequency higher than a predetermined frequency.

3. The image capture apparatus according to claim 2, wherein the input signal is corresponding to a green color.

4. The image capture apparatus according to claim 1, wherein the input signal is corresponding to a green color.

5. A method of controlling an image capture apparatus, comprising:
an extracting step of extracting a high frequency signal from an input signal;
a searching step of searching a pixel having the largest value among a pixel block around a subject pixel;
a level selecting step of (a) selecting a first level if a value of the pixel searched in the searching step is not larger than a first threshold value, (b) selecting a second level lower than the first level if the value of the pixel searched in the searching step is larger than the first threshold value and is smaller than a second threshold value, and (c) selecting a third level lower than the second level if the value of the pixel searched in the searching step is larger than the second threshold value; and
a noise component removing step of (a) removing a noise component from the high frequency signal using the first level if the first level is selected in the level selecting step, (b) removing a noise component from the high frequency signal using the second level if the second level is selected in the level selecting step, and (c) removing a noise component from the high frequency signal using the third level if the third level is selected in the level selecting step.

6. The method according to claim 5, wherein the high frequency signal includes a frequency higher than a predetermined frequency.

7. The method according to claim 6, wherein the input signal is corresponding to a green color.

8. The method according to claim 5, wherein the input signal is corresponding to a green color.

* * * * *